United States Patent
Phan et al.

(10) Patent No.: US 10,635,576 B2
(45) Date of Patent: Apr. 28, 2020

(54) BRANCH COVERAGE GUIDED SYMBOLIC EXECUTION FOR HYBRID FUZZ TESTING OF SOFTWARE BINARIES

(71) Applicant: FUJITSU LIMITED, Kawasaki-shi, Kanagawa (JP)

(72) Inventors: Quoc-Sang Phan, Mountain View, CA (US); Praveen Murthy, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/010,722

(22) Filed: Jun. 18, 2018

(65) Prior Publication Data

US 2019/0384697 A1    Dec. 19, 2019

(51) Int. Cl.
G06F 9/44    (2018.01)
G06F 11/36    (2006.01)

(52) U.S. Cl.
CPC ...... *G06F 11/3676* (2013.01); *G06F 11/3688* (2013.01)

(58) Field of Classification Search
CPC .......................... G06F 11/3676; G06F 11/3688
See application file for complete search history.

(56) References Cited

U.S. PATENT DOCUMENTS

| | | | |
|---|---|---|---|
| 7,483,824 B1 * | 1/2009 | Hill ................ | G01R 31/318357 438/14 |
| 2011/0314454 A1 * | 12/2011 | Godefroid ........... | G06F 11/3676 717/131 |
| 2012/0321085 A1 * | 12/2012 | Belenky ................ | H04L 9/3263 380/277 |
| 2013/0124921 A1 * | 5/2013 | Canini .................. | G06F 11/008 714/33 |
| 2013/0312103 A1 * | 11/2013 | Brumley ............... | G06F 21/577 726/25 |
| 2017/0139745 A1 * | 5/2017 | Scheuer ................ | G06F 9/4881 |
| 2018/0095865 A1 * | 4/2018 | Rogalla ............... | G06F 11/3684 |

(Continued)

OTHER PUBLICATIONS

Bin Zhang et al., Discover deeper bugs with dynamic symbolic execution and coverage-based fuzz testing, May 30, 2018 (Year: 2018).*

(Continued)

*Primary Examiner* — Adam Lee
(74) *Attorney, Agent, or Firm* — Maschoff Brennan

(57) ABSTRACT

According to some examples, computer-implemented methods for branch coverage guided symbolic execution for hybrid fuzzing are described. An example computer-implemented method may include receiving a seed input of a binary program under analysis (BPUA) that is discovered during testing by a greybox fuzzer. The method may also include concretely executing the seed input in the BPUA, and collecting a trace resulting from the concrete execution of the seed input. The method may further include determining whether the concrete execution of the seed input discovers a new branch. The method may include, responsive to a determination that the concrete execution of the seed input discovers a new branch, updating a bitmap to indicate that the new branch is discovered, wherein the bitmap is utilized by the greybox fuzzer to maintain a record of discovered branches in BPUA, and providing the seed input to the greybox fuzzer.

13 Claims, 5 Drawing Sheets

(56) References Cited

U.S. PATENT DOCUMENTS

2018/0365139 A1* 12/2018 Rajpal .................. G06F 21/577
2019/0258803 A1* 8/2019 Murthy ............... G06F 11/3688
2019/0361789 A1* 11/2019 Phan ................... G06F 11/3608

OTHER PUBLICATIONS

Böhme, Marcel, et al. "Directed greybox fuzzing." Proceedings of the 2017 ACM SIGSAC Conference on Computer and Communications Security. ACM. (Year: 2017).*
Böhme, Marcel, Van-Thuan Pham, and Abhik Roychoudhury. "Coverage-based greybox fuzzing as markov chain." IEEE Transactions on Software Engineering 45.5: 489-506. (Year: 2017).*
Bounimova, Ella, Patrice Godefroid, and David Molnar. "Billions and billions of constraints: Whitebox fuzz testing in production." Proceedings of the 2013 International Conference on Software Engineering. IEEE Press. (Year: 2013).*
Hu et al. "A Branch History Directed Heuristic Search for Effective Binary Level Dynamic Symbolic Execution". Special Section on Big Data Analytics in Internet of Things and Cyber-Physical Systems. IEEE Access (vol. 5, pp. 8752-8762). (Year: 2017).*
Godefroid, Patrice, Michael Y. Levin, and David A. Molnar. "Automated Whitebox Fuzz Testing." NDSS. vol. 8. (Year: 2008).*
Henderson, Andrew, et al. "VDF: Targeted evolutionary fuzz testing of virtual devices." International Symposium on Research in Attacks, Intrusions, and Defenses. Springer, Cham. (Year: 2017).*
Klees, George, et al. "Evaluating fuzz testing." Proceedings of the 2018 ACM SIGSAC Conference on Computer and Communications Security. ACM. (Year: 2018).*
Lemieux, Caroline, and Koushik Sen. "Fairfuzz: Targeting rare branches to rapidly increase greybox fuzz testing coverage." arXiv preprint arXiv:1709.07101. (Year: 2017).*
Lemieux, Caroline, and Koushik Sen. "Fairfuzz: A targeted mutation strategy for increasing greybox fuzz testing coverage." Proceedings of the 33rd ACM/IEEE International Conference on Automated Software Engineering. ACM. (Year: 2018).*
Liang, Jie, et al. "Fuzz testing in practice: Obstacles and solutions." 2018 IEEE 25th International Conference on Software Analysis, Evolution and Reengineering (SANER). IEEE. (Year: 2018).*
Patil, Ketan, and Aditya Kanade. "Greybox fuzzing as a contextual bandits problem." arXiv preprint arXiv:1806.03806. (Year: 2018).*
Pham, Van-Thuan. Enhancing Directed Search in Black-box, Greybox and White-box Fuzz Testing. Diss. National University of Singapore (Singapore). (Year: 2017).*
Tang, Huabin, and Wei Wang. "Improvement of Seed Selection Strategy for Graybox Fuzzing." 7th International Conference on Education, Management, Information and Mechanical Engineering (EMIM 2017). Atlantis Press. (Year: 2017).*
Wang, Jiyuan, et al. "QuanFuzz: Fuzz Testing of Quantum Program." arXiv preprint arXiv:1810.10310. (Year: 2018).*
Yang, Dingning, Yuqing Zhang, and Qixu Liu. "Blendfuzz: A model-based framework for fuzz testing programs with grammatical inputs." 2012 IEEE 11th International Conference on Trust, Security and Privacy in Computing and Communications. IEEE. (Year: 2012).*
Zhang B, Ye J, Bi X, Feng C, Tang C. FFUZZ: Towards full system high coverage fuzztesting on binary executables. PLoS ONE 13 (5): e0196733. (Year: 2018).*
Cha et al. "Unleashing Mayhem on Binary Code". 2012 IEEE Symposium on Security and Privacy (pp. 380-394). (Year: 2012).*
Cha et al. "Unleashing Mayhem on Binary Code" 2012 IEEE Symposium on Security and Privacy, pp. 380-394, May 2012.
Galeotti et al. "Improving search-based test suite generation with dynamic symbolic execution" ISSRE, Nov. 2013.
Stephens et al. "Driller: Augmenting Fuzzing Through Selective Symbolic Execution" NDSS, Jan. 2016.

* cited by examiner

BRANCH COVERAGE GUIDED SYMBOLIC EXECUTION FOR HYBRID FUZZ TESTING OF SOFTWARE BINARIES

FIELD

This disclosure relates generally to branch coverage guided symbolic execution for hybrid fuzz testing of software.

BACKGROUND

Automated testing methods are generally used to test binary programs. For instance, binary programs may be tested using automated testing methods to discover potential vulnerabilities in the binary programs. Some automated testing methods generate random inputs to test the binary programs. One example of such automated testing methods is fuzz testing. Fuzz testing is guided by branch coverage, and generally involves testing of a binary program using random inputs to cause each branch of the binary program to execute. Fuzz testing provides for fast testing of binary programs. However, fuzz testing of a binary program may result in branches of the binary program not being covered or tested. Another example of such automated testing methods is symbolic execution. Symbolic execution is guided by path coverage, and generally involves analyzing a binary program to determine what inputs cause each path of the binary program to execute. Unfortunately, symbolic execution is many orders of magnitude slower than fuzz testing. In addition, symbolic execution may be susceptible to path explosion. Path explosion may occur when the binary program being tested includes too many paths to symbolically explore. Path explosion may result in an incomplete test of the binary program.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to some examples, computer-implemented methods for branch coverage guided symbolic execution for hybrid fuzzing are described. An example computer-implemented method may include receiving a seed input of a binary program under analysis (BPUA) that is discovered during testing by a greybox fuzzer. The method may also include concretely executing the seed input in the BPUA, and collecting a trace resulting from the concrete execution of the seed input. The method may further include determining whether the concrete execution of the seed input discovers a new branch. The method may include, responsive to a determination that the concrete execution of the seed input discovers a new branch, updating a bitmap to indicate that the new branch is discovered, wherein the bitmap is utilized by the greybox fuzzer to maintain a record of discovered branches in BPUA, and providing the seed input to the greybox fuzzer.

The objects and advantages of the embodiments will be realized and achieved at least by the elements, features, and combinations particularly pointed out in the claims.

Both the foregoing general description and the following detailed description are given as examples, are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
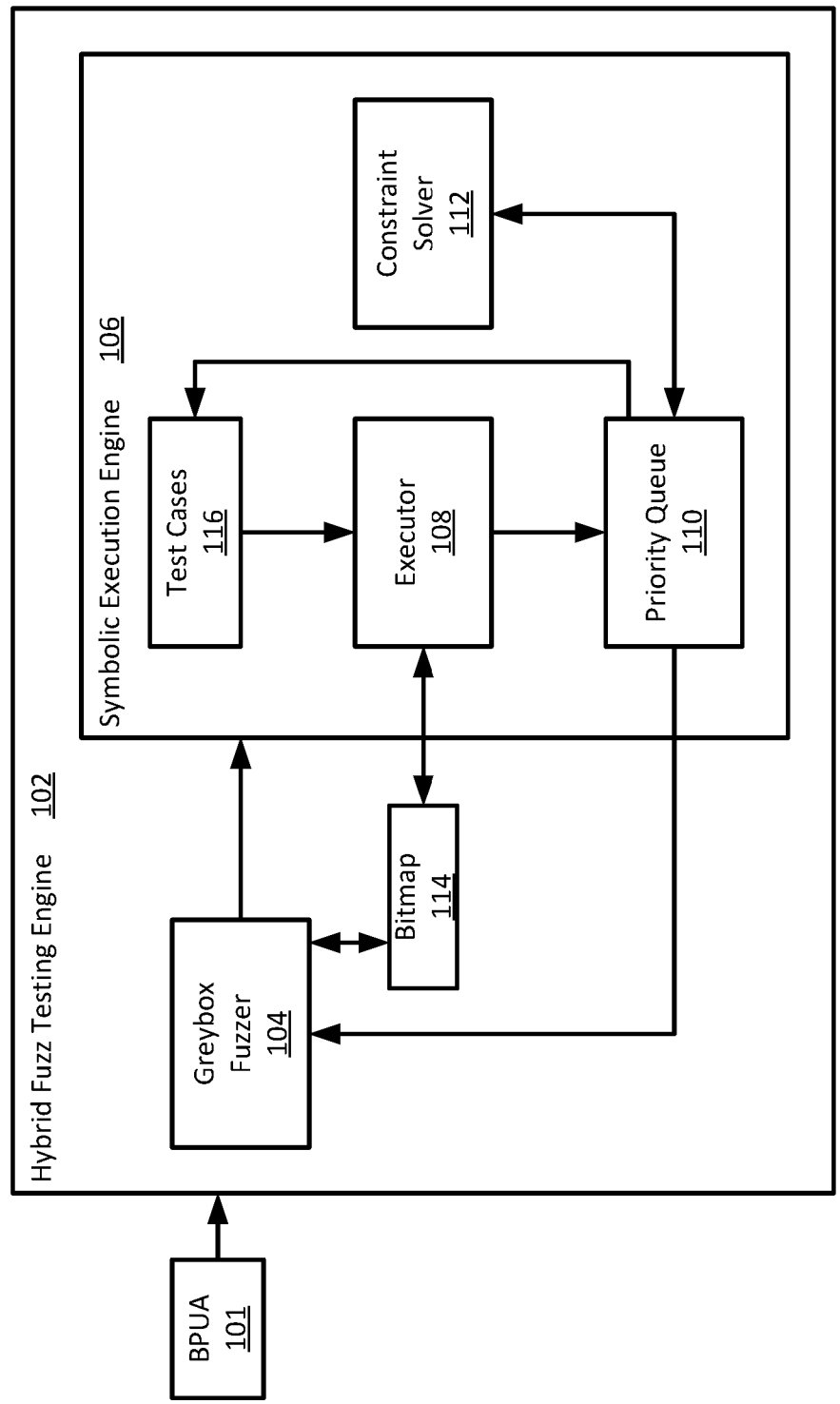
FIG. 1 is a block diagram of an example environment in which a branch coverage guided symbolic execution in hybrid fuzz testing may be implemented.

Hybrid fuzz testing is a technique for discovering vulnerabilities in software and, in particular, program binaries. A hybrid fuzzer includes a combination of a symbolic execution and coverage-guided greybox fuzzer. Generally, the greybox fuzzer repeatedly executes a software under test using a large number (e.g., thousands or hundreds of thousands) of randomly generated inputs. The greybox fuzzer records information regarding the branch coverage of the software that results from testing the software using the inputs to select "interesting" inputs. For instance, if two inputs cover the same branch in the software, only one of the two inputs is retained (kept) and the other test is discarded. Further, if an input covers a different branch in the software, the input is identified (e.g., marked) as an interesting input, and queued for analysis. The greybox fuzzer mutates the queued interesting inputs, and tests the software using the mutated inputs to determine whether the software crashes (e.g., stops executing) or exhibits an unwanted or unexpected behavior. When the greybox fuzzer is unable to identify interesting inputs to test the software, the greybox fuzzer may get "stuck" testing the software. At this point, symbolic execution may be invoked to discover unexplored branches. For instance, a symbolic execution engine may test the software using an input to gather constraints (e.g., path conditions). The input may be an arbitrary input or an input provided by the greybox fuzzer. Inputs that discover new branch conditions in the software are queued for transformation. The symbolic execution engine may systematically negate branch conditions in the software to determine new inputs that may drive execution of the software along the branch conditions. These new inputs may be provided or otherwise made available to the greybox fuzzer for use in continued testing of the software. The greybox fuzzer may continue to mutate (e.g., generate new random inputs) the provided inputs, and test the software using the mutated inputs. Some additional details of a hybrid fuzzer can be found in U.S. application Ser. No. 15/198,064, which is incorporated herein by reference in its entirety. In addition, some other example greybox fuzzers include American Fuzzy Lop and libfuzzer as well as variants thereof. Some additional details of the American Fuzzy Lop can be found at http://lcamtuf.coredump.cx/afl/. Some additional details of libfuzzer can be found at https://llvm.org/docs/LibFuzzer.html.

One challenge in hybrid fuzzing is the effective integration of the greybox fuzzer and symbolic execution. Symbolic execution is a white box fuzzing technique that uses program analysis and constraint solving to synthesize inputs that exercise different program paths. As such, symbolic execution is guided by path coverage due to the systematic search to explore the paths in the software under test (e.g., the goal of symbolic execution is to trigger unexpected behavior by discovering the paths in the software). In contrast, the greybox fuzzer is guided by branch coverage due to its exploration of the branches in the software (e.g., the goal of the greybox fuzzer is to trigger unexpected behavior by discovering the branches in the software). So, for instance, symbolic execution may determine that an input is an interesting input in that the input discovers a new path, and accordingly provide the input to the greybox fuzzer. Unfortunately, although symbolic execution considers an input as an interesting input, this interesting input may not lead the greybox fuzzer to discover a new branch (e.g., discover a branch that is new to the greybox fuzzer). As such, in terms of branch coverage, symbolic execution may merely repeat the testing performed by the greybox fuzzer. Repeated discovery of a branch is inefficient in that it wastes computational resources. This is compounded by the fact that symbolic execution is a computationally expensive process.

To this end, techniques are disclosed for providing branch coverage guided symbolic execution for hybrid fuzzing. Branch coverage symbolic execution may be achieved by sharing information between the greybox fuzzer and the symbolic execution components of a hybrid fuzzer. In accordance with some embodiments of the present disclosure, the greybox fuzzer generates a bitmap for each software under test. During hybrid fuzz testing of the software, the greybox fuzzer uses the bitmap to maintain a record of the branches discovered in the software. This bitmap is shared with a symbolic execution engine that performs symbolic execution of the software as part of the hybrid fuzzing. For instance, the symbolic execution engine may use the information in the bitmap to determine whether an input discovers a new branch in the software, and identify such input as an interesting input. Use of the bitmap enables the symbolic execution engine to discard inputs that do not discover new branches, even though these inputs may have discovered new paths in the software. Accordingly, the symbolic execution is guided by branch coverage, and the symbolic execution engine may provide the greybox fuzzer interesting inputs that discover branches in the software that have not been previously discovered based on the bitmap. The symbolic execution engine also records the discovery of such branches during symbolic execution in the bitmap. This allows the greybox fuzzer to avoid re-discovering branches in the software that have been previously discovered by the symbolic execution engine. Thus, the sharing of branch coverage information in the bitmap results in improved integration between the greybox fuzzer and the symbolic execution components of the hybrid fuzzer.

The disclosed techniques significantly improve the efficiency (e.g., reduce computational resources, increase speed, and the like) of hybrid fuzzing. For example, inputs that do not discover new branches in the program may be discarded, and not used to repeatedly discover the same branch in a software under test. Additionally, embodiments described in the present disclosure may accordingly improve effectiveness of the hybrid fuzzing. For example, both the greybox fuzzer and the symbolic execution engine work toward achieving branch coverage during testing without duplicating the efforts of the other. Furthermore, by being guided by branch coverage and not path coverage, symbolic execution may mitigate the path explosion problem, which is a situation where the number of paths exponentially grows for each branch, for instance, in the case of for loops and recursion. These and other advantages and alternative embodiments will be apparent in light of this disclosure.

FIG. 1 is a block diagram of an example environment 100 in which a branch coverage guided symbolic execution in hybrid fuzz testing may be implemented, in accordance with at least some embodiments of the present disclosure. As depicted, environment 100 may include a hybrid fuzz testing engine 102 that may be configured to execute hybrid fuzz testing of a binary program under analysis (BPUA) 101. BPUA 101 may include any software program that is tested to discover vulnerabilities and/or tested for operation of BPUA 101.

Hybrid fuzz testing engine 102 and one or more components or modules thereof described herein may be implemented using hardware including a processor, a microprocessor (e.g., to perform or control performance of one or more operations), a field-programmable gate array (FPGA), or an application-specific integrated circuit (ASIC). In some other instances, hybrid fuzz testing engine 102 may be implemented using a combination of hardware and software. Implementation in software may include rapid activation and deactivation of one or more transistors or transistor elements such as may be included in hardware of a computing system (e.g., depicted in FIG. 5). Additionally, software defined instructions may operate on information within transistor elements. Implementation of software instructions may at least temporarily reconfigure electronic pathways and transform computing hardware.

As illustrated in FIG. 1, hybrid fuzz testing engine 102 may include a greybox fuzzer 104 and a symbolic execution engine 106, which may further include an executor 108, a priority queue 110, and a constraint solver 112. Greybox fuzzer 104 may be configured to repeatedly execute BPUA 101 using random or mutated inputs. Briefly, in overview, greybox fuzzer 104 may be guided by branch coverage. So, for instance, according to an embodiment, greybox fuzzer 104 measures branch coverage of the BPUA 101 to select interesting inputs. As used with reference to the inputs, the term "interesting" may indicate that the input may be analyzed further for, for instance, determining additional inputs to test software, such as BPUA 101. For instance, an interesting input may discover a new branch in BPUA 101. The interesting input may be queued for analysis. Greybox fuzzer 104 may be configured such that if two inputs cover the same branch in BPUA 101, only one input is retained. That is, if greybox fuzzer 104 determines that multiple inputs cover the same branch in BPUA 101, greybox fuzzer 104 may retain one of the multiple inputs, and discard the remaining of the multiple inputs that cover the same branch as the retained input. Greybox fuzzer 104 may mutate the interesting inputs, for instance, in the queue. Greybox fuzzer 104 may then execute the BPUA 101 using mutation of the interesting inputs. Execution of BPUA 101 using the mutations of the interesting inputs may result in a crash of BPUA 101 and/or exhibition of unwanted behavior by BPUA 101.

In some implementations, greybox fuzzer 104 may implement and utilize a bitmap 114. Bitmap 114 may be associated with BPUA 101, and may include information (data) that indicates the branches (e.g., the branch conditions) in BPUA 101 that have been discovered during hybrid fuzz testing of BPUA 101. For instance, at the start of testing BPUA 101, greybox fuzzer 104 may instrument each basic block in BPUA 101 with a randomly generated identifier (ID). A basic block is a straight-line code sequence with no branches in except to the entry and no branches out except at the exit. A branch condition generates (starts) a new basic block. So, for instance, a program that does not include any branch condition is a single basic block. Accordingly, basic blocks may form the vertices or nodes in a control flow graph. In some embodiments, the randomly generated ID assigned to each basic block may be a unique ID. When greybox fuzzer 104 discovers a new branch (e.g., a branch not previously covered), greybox fuzzer 104 may maintain a record of the newly discovered branch in bitmap 114. In some embodiments, bitmap 114 may be implemented as a vector, where each bit in the vector corresponds to a branch in BPUA 101. In the context of branches, a transition from one basic block (e.g., a first basic block) to another basic block (e.g., a second basic block) may be considered a branch. As such, the terms "branch" and "transition" may be used interchangeably herein, unless context indicates otherwise.

In such embodiments, greybox fuzzer 104 may identify the bit in bitmap 114 that corresponds to the newly discovered transition (e.g., branch), and set the value of the corresponding bit (e.g., from '1' to '0') to indicate that the transition has been discovered. For instance, suppose the newly discovered transition is from basic block A to basic block B. In this case, the location in bitmap 114 corresponding to the transition from basic block A to basic block B may be determined by hashing the identifiers assigned to basic block A and basic block B using, for example, a bitwise XOR operation. Greybox fuzzer 104 may then use bitmap 114 to determine whether an input is an interesting input. For instance, greybox fuzzer 104 may determine whether an input discovers a new branch (e.g., a new transition and thus provides new branch coverage) based on the records of the discovered transitions in bitmap 114. If bitmap 114 indicates that a transition discovered by an instruction has not been previously discovered, greybox fuzzer 104 may indicate that the transition is discovered in bitmap 114 and identify the input as an interesting input.

In some instances, greybox fuzzer 104 may be unable to find interesting inputs. An example of these instances is when inputs being considered belong to explored paths (e.g., discovered branches). Thus, during an initial period of testing, there may be multiple interesting inputs because the number of explored paths is low. However, as more paths of BPUA 101 are explored, it may become more difficult to find interesting inputs.

In these and other instances, symbolic execution engine 106 may be invoked. Symbolic execution engine 106 may be used, for instance, to transition greybox fuzzer 104 to another compartment of BPUA 101. The term "compartment" when associated with BPUA 101 may include a subset of input space. In general, inputs in the same compartment may result in BPUA 101 exhibiting similar behavior. Greybox fuzzer 104 may discover inputs in the same compartment. However, greybox fuzzer 104 may have difficulty moving to another compartment without assistance from symbolic execution engine 106.

In the case BPUA 101 includes loops and/or recursions, however, some existing symbolic execution engines may fail to discover a new branch in BPUA 101 within a reasonable amount of time as a result of becoming "stuck" in the branches that are visited by a large number of paths. This is often referred to as the "path explosion problem" as there are too many paths to explore. As a result, symbolic execution may generate new inputs that discover new paths, but not a new branch. Hence, those inputs may be considered by the greybox fuzzer 104 as "uninteresting". In these cases, the symbolic execution engine does not help the greybox fuzzer in anyway, and even reduces the productivity of the greybox fuzzer by providing bad inputs as seeds. These existing symbolic execution engines do not have a global perspective of the inputs and branches that have been previously discovered by greybox fuzzer 104 or the existing symbolic execution engines. Accordingly, the existing symbolic execution engines cannot efficiently negate conjunctions along a path of BPUA 101.

Existing symbolic execution engines execute interesting inputs and gather constraints (e.g., branch conditions and transformations on the input). Such symbolic execution engines systematically negate branch conditions to determine new inputs that may drive execution in BPUA 101 along the negated branch. The new inputs may be communicated or otherwise provided to greybox fuzzer 104. Greybox fuzzer 104 may mutate the new inputs provided by such a symbolic execution engine, and execute BPUA 101 using mutated inputs to increase coverage of BPUA 101 (e.g., discover new branches in BPUA 101).

For instance, in an example, suppose BPUA 101 includes:

```
Location A
for (; x < 100; ++x) {
    Location B
    if (x > 50) {
        Location C
        if (y > 41) {
            Location D
            abort( )
        }
        Location E
    }
    Location F
}
Location G
```

In this example, an existing symbolic execution engine may test BPUA 101 using one or more inputs (e.g., test cases). For instance, suppose an input x is assigned specific values as follows: x=3, x=20, and x=70. In this case, the existing symbolic execution engine may concretely execute BPUA 101 using x=3, and discover the path conditions (x<100), (x+1<100), (x+2<100), . . . , (x+96<100), and (NOT x+97<100). The existing symbolic execution engine may similarly concretely execute BPUA 101 using x=20 and discover the path conditions (x<100), (x+1<100), (x+2<100), . . . , (x+79<100), and (NOT x+80<100). The existing symbolic execution engine may also concretely execute BPUA 101 using x=70 and discover the path conditions (x<100) and (x>50), (x+1<100) and (x+1>50), . . . . In the case of this example, the existing symbolic execution engine may consider these three specific inputs, x=3, x=20, and x=70, as interesting inputs since each of the three inputs discover new paths in BPUA 101. However, in the context of branch conditions, note that the inputs x=3 and x=20 discover the same branches in BPUA 101. That is, concrete execution of x=20 does not discover a new branch that was not discovered during concrete execution of x=3. With regard to branch coverage, the existing symbolic execution engine is inefficient in that it repeatedly discovered the same branch. Furthermore, providing the inputs x=3 and x=20 as interesting inputs to greybox fuzzer 104 may not result in greybox fuzzer 104 discovering new branches in BPUA 101. For instance, greybox fuzzer 104 may mutate interesting input x=3 and discover the same branch, for example, branch A→B, that was previously discovered by the existing symbolic execution engine that provided the interesting input x=3 to greybox fuzzer 104. Indeed, re-discovering branches in BPUA 101 makes both greybox fuzzer 104 and the existing symbolic execution engine, and existing hybrid fuzz testing in general, less efficient.

Symbolic execution engine 106 of FIG. 1 addresses the shortcomings of existing symbolic execution engines described above. For example, symbolic execution engine 106 utilizes bitmap 114 to learn of the branches discovered by greybox fuzzer 104. Symbolic execution engine 106 also uses bitmap 114 to communicate to greybox fuzzer 104 the branches discovered by symbolic execution engine 106. As will be appreciated in light of this disclosure, knowledge of the previously discovered branches provides improved integration of greybox fuzzer 104 and symbolic execution engine 106, which results in increased efficiency in hybrid fuzz testing. Symbolic execution engine 106 may also utilize branch coverage information to guide its search for interesting inputs. The branch coverage information allows symbolic execution engine 106 to implement symbolic execution that is guided by branch coverage, thus providing improved compatibility between symbolic execution engine 106 and greybox fuzzer 104.

As previously noted, symbolic execution engine 106 includes executor 108, queue 110, and constraint solver 112. Symbolic execution engine 106 may be configured to perform branch coverage guided symbolic testing in hybrid fuzz testing of BPUA 101. For instance, symbolic execution engine 106 may perform the branch coverage guided symbolic testing based on a set of inputs, such as test cases 116.

Symbolic execution engine 106 may perform concolic execution. Concolic execution is a form of dynamic symbolic execution. The term concolic is a portmaneau of CONcrete and symbOLIC, which indicates that the concolic execution includes concrete execution and symbolic execution. For instance, first, a software under test, such as BPUA 101, may be executed using concrete values (e.g., specific values) for a set of inputs, such as test cases 116, to collect a trace. The collected trace may, for example, indicate whether execution of the software using a concrete value for a specific input follows a TRUE branch or a FALSE branch responsive to a conditional statement in the software. Following the concrete execution, the software may be symbolically executed using symbolic values for the set of inputs, instead of concrete values. The trace collected during concrete execution may guide the symbolic execution of the software using symbolic values. For example, when there is a condition (x>5), execution with x as a symbolic value X satisfies both branches X>5 and X<=5. However, execution of the condition with x having a concrete value, such as x=10, leads to the TRUE branch in the execution trace.

In some embodiments, test cases 116 made be provided or otherwise made available by greybox fuzzer 104. Test cases 116 may be discovered during fuzz testing by the greybox fuzzer 104. For instance, test cases 116 may include interesting inputs that are discovered by greybox fuzzer 104 during fuzz testing of BPUA 101. The interesting inputs may include inputs to BPUA 101 that discover or lead to new paths in BPUA 101. In other embodiments, test cases 116 may be arbitrary inputs that are provided by, for example, a user of hybrid fuzz testing engine 102.

In some embodiments, executor 108 may be configured to concretely execute an input included in test cases 116. For instance, executor 108 may execute BPUA 101 using a specific value assigned to the input. In this instance, executor 108 treats the input (e.g., input variable) as a specific value, which results in the concrete execution of the input in BPUA 101. For example, in the case of an expression in BPUA 101 that includes a variable, concrete execution may include execution of the expression using a specific value assigned to the variable. Concrete execution of BPUA 101 results in one path taken through BPUA 101 as determined by the specific value of the input.

Executor 108 may also be configured to collect a trace that results from the concrete execution of the input. As described previously, the trace includes information regarding the path taken through BPUA 101 during concrete execution of the input. For example, in the case of an IF-THEN-ELSE conditional statement, the trace may indicate whether the THEN path was executed or the ELSE path was executed during the concrete execution.

In some embodiments, executor 108 may be configured to symbolically execute the concretely executed input using the trace collected from the concrete execution of the input. For instance, executor 108 may re-execute BPUA 101 using a symbolic value for the input instead of the specific value used during concrete execution. In this instance, executor 108 treats the input (e.g., input variable) as a symbolic value, which results in the symbolic execution of the input in BPUA 101. For example, in the case of an expression in BPUA 101 that includes a variable, symbolic execution may include execution of the expression using a symbolic value for the variable. Executor 108 may symbolically execute the input along the path taken through BPUA 101 during concrete execution of the input using information from the collected trace.

In such embodiments, executor 108 may also be configured to collect the constraints satisfied by the input (or inputs) along the path executed through BPUA 101. Referring to example BPUA 101 presented above, examples of constraints include "x<100", "x>50", and "y<41". The collected constraints may be used to generate new inputs for testing BPUA 101. For instance, according to some embodiments provided herein, a constraint or part of a constraint may be negated, and the negated constraint may be solved to generate a new input for testing BPUA 101.

Executor 108 may be configured to determine whether the concretely executed input discovers a new branch in BPUA 101. Executor 108 may determine whether a branch discovered during concrete execution of the input is a new branch (e.g., previously undiscovered) from the information included in bitmap 114. For instance, each basic block in BPUA 101 may be instrumented with a respective ID by greybox fuzzer 104, and executor 108 may utilize the IDs assigned to the basic blocks and the information included in bitmap 114 to determine whether the discovered branch is a new branch. If executor 108 determines that the concretely executed input discovers a new branch, executor 108 may update bitmap 114 to indicate that the newly discovered branch is now discovered. In this manner, symbolic execution engine 106 communicates discovery of the new branch to greybox fuzzer 104, enabling greybox fuzzer to avoid re-discovering the same branch during its testing of BPUA 101. Executor 108 may include the concretely executed input in queue 110 as an interesting input. As will be further discussed below, symbolic execution engine 106 may generate new inputs to test BPUA 101 based on the interesting inputs in queue 110.

Queue 110 may be configured as a priority queue of inputs. In some embodiments, a priority assigned to an input in queue 110 may be determined based on whether the input discovers a new branch. For example, an input that discovers a new branch is assigned a higher priority than an input that does not discover a new branch. In other embodiments, a priority assigned to an input in queue 110 may be determined based on the number of new branches discovered by the input. For example, an input that discovers a larger number of new branches is assigned a higher priority than an input that discovers a smaller number of new branches.

Otherwise, if executor 108 determines that the concretely executed input does not discover a new branch, executor 108 may discard the concretely executed input (e.g., the specific value assigned to the input). In an example implementation, executor 108 may discard the input by not including the input in queue 110. As will be appreciated in light of this disclosure, branch discovery information in bitmap 114 allows executor 108 to avoid further using such inputs (e.g., to generate new inputs for testing based on inputs that did not discover new branches) during symbolic execution of BPUA 101 as variously described herein.

In some embodiments, executor 108 may provide or otherwise make available the input that discovers a new branch, including the specific value of the input used to discover the new branch, to greybox fuzzer 104, for example, as an interesting input. Greybox fuzzer 104 may then mutate the input provided by symbolic execution engine 106 to generate additional inputs to test BPUA 101.

In some embodiments, executor 108 may be configured to transform inputs included in queue 110, and provide or otherwise make available the transformed input to constraint solver 112. For instance, executor 108 may transform the inputs in queue 110 based on the respective priority of the inputs. In an example implementation, executor 108 may transform an input by negating a constraint or a part of the constraint associated with the input. As described previously, the constraint may be collected during symbolic execution of BPUA 101 using the trace collected from the concrete execution of the input. As an example, suppose the constraint is "input has four or more vowels". In this case, executor 108 may negate this constraint to generate a negated constraint, "input has less than four vowels". As another example, suppose the constraint is "input begins with the letter 'T' AND input has a second letter 'R'". In this case, executor 108 may negate this constraint by negating the first part of the constraint (e.g., input begins with the letter 'T'), negating the second part of the constraint (e.g., input has a second letter 'R'), negating both the first and second parts of the constraint, negating the constraint operator (e.g., AND), or a combination of such components of the constraint. As still another example, suppose the constraint is "x<50". In this case, executor 108 may negate this constraint to generate a negated constraint, "x>50". As will be appreciated, a constraint may be negated in a large number of ways depending on the constraint.

Constraint solver 112 may be configured to determine whether a provided constraint is satisfiable and, if satisfiable, generate a model that solves the constraint. In some embodiments, constraint solver 112 may be implemented using any existing Satisfiability Modulo Theories (SMT) solver such as, Z3, Boolector, or any other suitable constraint solver. For instance, the provided constraint may be a negated constraint provided by executor 108. As an example, suppose the constraint is "x<3 AND x>5". In this case, constraint solver determines that the constraint is not satisfiable, and may generate an error condition (e.g., error code or message). As another example, suppose the constraint is "x>100 AND x<102". In this case, constraint solver determines that the constraint is satisfiable, and may generate "x=101" as a model that solves the constraint. Constraint solver 112 may provide or otherwise make available the model as an interesting input to executor 108. In some embodiments, constraint solver 112 may provide the model in a queue that is accessible by executor 108. Executor 108 may use the provided model to generate a new input for testing BPUA 101.

Modifications, additions, or omissions may be made to environment 100 without departing from the scope of the present disclosure. For example, environment 100 may include one or more hybrid fuzz testing engines 102, one or more greybox fuzzers 104, one or more symbolic execution engines 106, or any combination thereof. Moreover, the separation of various components and servers in the embodiments described herein is not meant to indicate that the separation occurs in all embodiments. For example, executor 108 and constraint solver 112 may be a single component. In addition, note that the various components of hybrid fuzz testing engine 102 may all be in a stand-alone computing system according to some embodiments, while in others, may be distributed across multiple machines. In a more general sense, the degree of integration and distribution of the functional component(s) provided herein can vary greatly from one embodiment to the next, as will be appreciated in light of this disclosure.

FIGS. 2A-2D conceptually illustrate a methodology for branch coverage guided symbolic execution, in accordance with at least some embodiments of the present disclosure. For instance, the branch coverage guided symbolic execution may be performed on a portion of a binary program under analysis 200 (referred to as BPUA for brevity) by a symbolic execution engine, such as symbolic execution engine 106 of hybrid fuzz testing engine 102. The illustrated methodology identifies interesting inputs during branch coverage symbolic execution of BPUA 200.

Figure 2A:
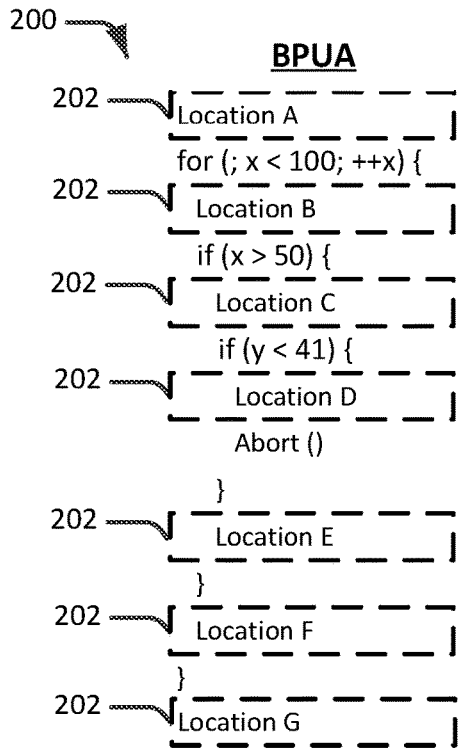
FIGS. 2A-2D conceptually illustrate a methodology for branch coverage guided symbolic execution.

FIG. 2A illustrates the basic blocks of BPUA 200 and associated respective IDs 202. For instance, a greybox fuzzer, such as greybox fuzzer 104, may instrument each basic block in BPUA 200 with a randomly generated ID at the start of hybrid fuzz testing of BPUA 200. As illustrated in FIG. 2A, IDs 202 include "Location A", "Location B", "Location C", "Location D", "Location E", "Location F", and "Location G". Each ID 202 is assigned to a respective basic block in BPUA 200. As described previously, IDs 202 may be used to identify the branches (transitions) in BPUA 200. IDs 202 may also be used to determine locations in a bitmap, such as bitmap 114, for recording (e.g., indicating) the discovery of the branches.

Figure 2B:
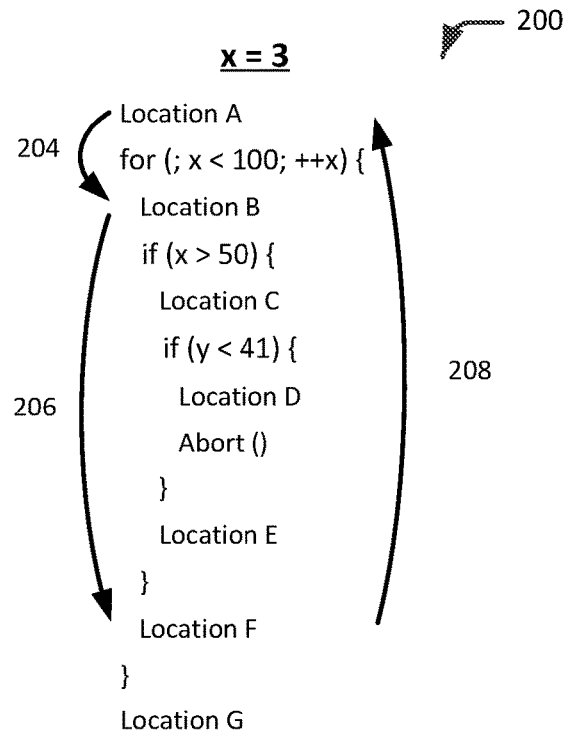

FIG. 2B illustrates the branches discovered during the concrete execution of a seed input x=3 in BPUA 200. As illustrated in FIG. 2B, three branches 204, 206, and 208 may be discovered in BPUA 200 by concretely executing x=3. Branch 204 is a transition from the basic block identified by Location A to the basic block identified by Location B (Location A→Location B), branch 206 is a transition from the basic block identified by Location B to the basic block identified by Location F (Location B→Location F), and branch 208 is a transition from the basic block identified by Location F to the basic block identified by Location A (Location F→Location A). Symbolic execution engine 106 may check bitmap 114 to determine whether any of branches 204, 206, or 208 are newly discovered branches. If any of branches 204, 206, or 208 are newly discovered branches, symbolic execution engine 106 may record the discovery of the new branches in bitmap 114, and provide or otherwise make available the input x=3 to greybox fuzzer 104, for example, as an interesting input. In the case that any of branches 204, 206, or 208 are newly discovered branches, symbolic execution engine 106 may also identify the input x=3 as an interesting input for use in generating a new input for symbolic execution of BPUA 200.

Figure 2C:
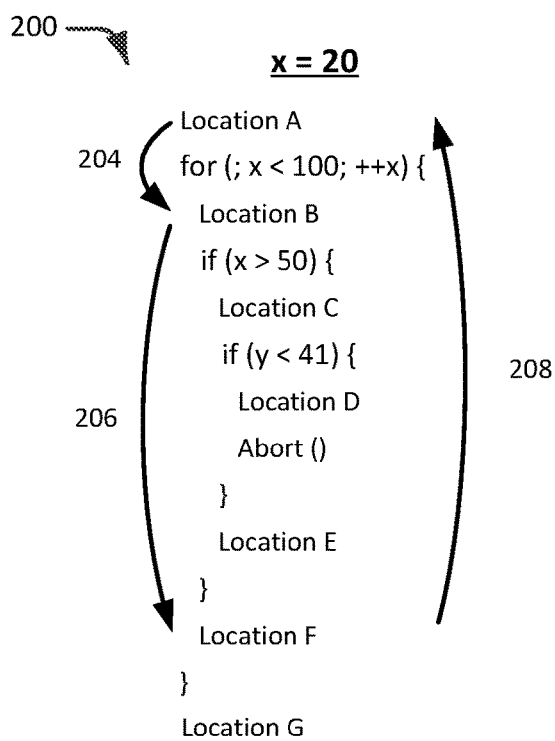

Subsequently, symbolic execution engine 106 may concretely execute seed input x=20. FIG. 2C illustrates the branches discovered during the concrete execution of the seed input x=20 in BPUA 200. Note that the same three branches 204, 206, and 208 discovered by concrete execution of x=3 in BPUA 200 may be re-discovered during concrete execution of x=20 in BPUA 200. Symbolic execution engine 106 may check bitmap 114 to determine that branches 204, 206, or 208 are not newly discovered branches. That is, concrete execution of x=20 in BPUA 200 does not discover any new branches. As such, symbolic execution engine 106 may discard the input x=20 (e.g., not identify x=20 as an interesting input).

Figure 2D:
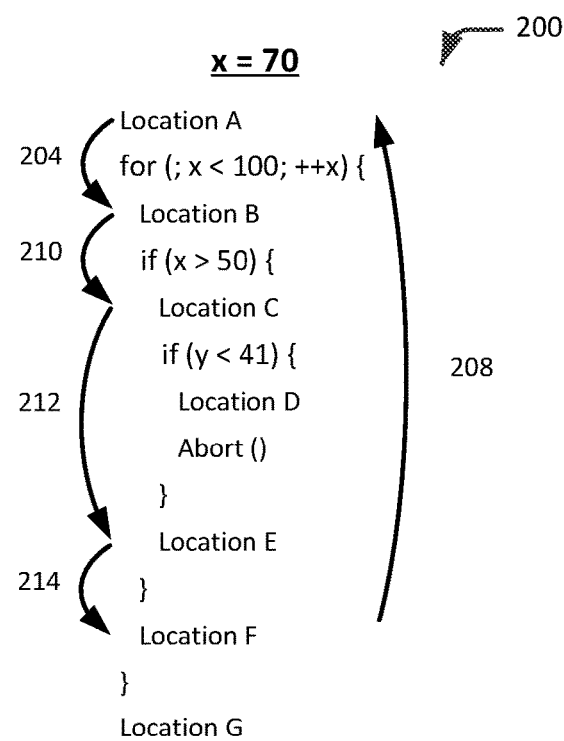

Subsequently, symbolic execution engine 106 may concretely execute seed input x=70. FIG. 2D illustrates the branches discovered during the concrete execution of the seed input x=70 in BPUA 200. As illustrated in FIG. 2D, five branches 204, 208, 210, 212, and 214 may be discovered in BPUA 200 by concretely executing x=70. Branch 204 is a transition from the basic block identified by Location A to the basic block identified by Location B (Location A→Location B), branch 210 is a transition from the basic block identified by Location B to the basic block identified by Location C (Location B→Location C), branch 212 is a transition from the basic block identified by Location C to the basic block identified by Location E (Location C→Location E), branch 214 is a transition from the basic block identified by Location E to the basic block identified by Location F (Location E→Location F), and branch 208 is a transition from the basic block identified by Location F to the basic block identified by Location A (Location F→Location A). Symbolic execution engine 106 may check bitmap 114 to determine that branches 210, 212, and 214 are newly discovered branches, and branches 204 and 208 are not newly discovered branches. Since concrete execution of x=70 in BPUA 200 discovers at least one new branch, symbolic execution engine 106 may record the discovery of the new branches (in this case, branches 210, 212, and 214) in bitmap 114, and provide or otherwise make available the input x=70 to greybox fuzzer 104, for example, as an interesting input. Symbolic execution engine 106 may also identify the input x=70 as an interesting input for use in generating a new input for symbolic execution of BPUA 200.

Figure 3:
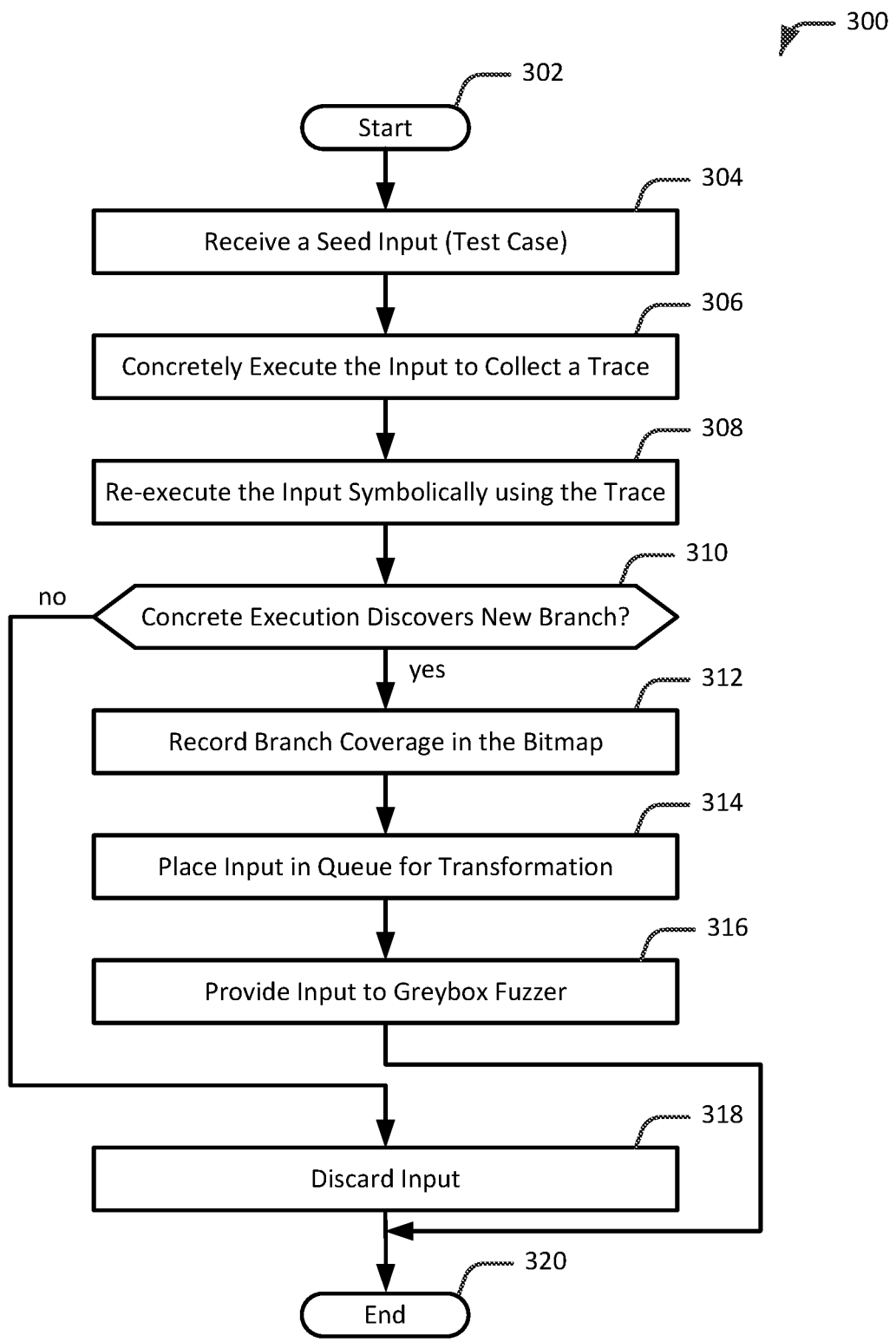
FIG. 3 is a flow diagram illustrating an example process for branch coverage guided symbolic execution.
Figure 4:
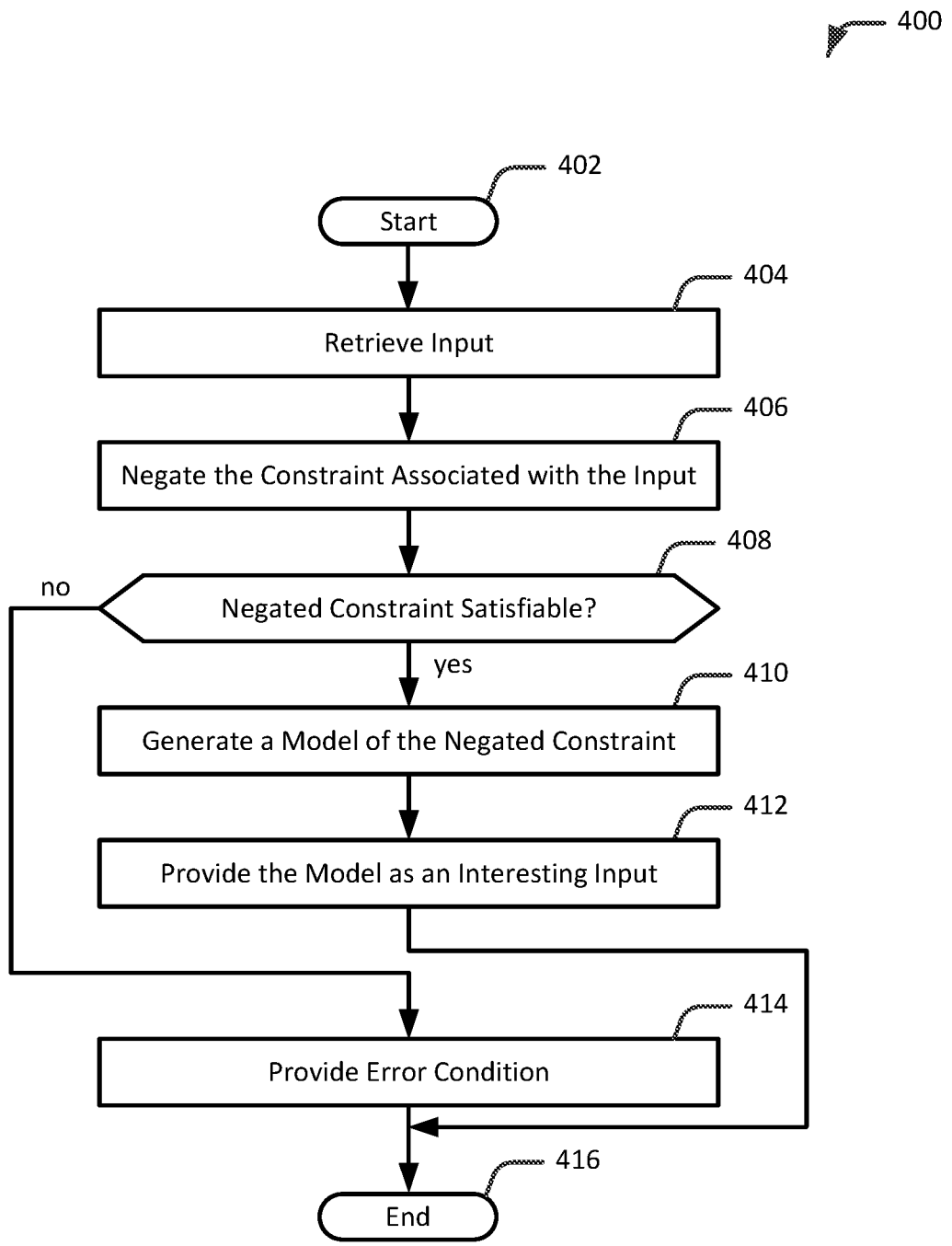
FIG. 4 is a flow diagram illustrating an example process 400 for transforming an interesting input and generating a new input for symbolic execution.

FIG. 3 is a flow diagram illustrating an example process 300 for branch coverage guided symbolic execution, in accordance with at least some embodiments of the present disclosure. FIG. 4 is a flow diagram illustrating an example process 400 for transforming an interesting input and generating a new input for symbolic execution, in accordance with at least some embodiments of the present disclosure. The operations, functions, or actions illustrated in example process 300 and example process 400 may in some embodiments be performed by various components of hybrid fuzz testing engine 102 of FIG. 1. The operations, functions, or actions described in the respective blocks of example process 300 and example process 400 may also be stored as computer-executable instructions in a computer-readable medium, such as memory 504 and/or data storage 506 of a computing system 500.

As will be further appreciated in light of this disclosure, for this and other processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

With reference to FIG. 3, process 300 is initiated at block 302. Process 300 may be implemented by symbolic execution engine 106 of hybrid fuzz testing engine 102 as variously described herein. By way of an example use case, during hybrid fuzz testing of a software under test (software), greybox fuzzer 104 may be unable to find an interesting input, and may invoke symbolic execution engine 106.

At block 304, symbolic execution engine 106 receives a seed input (test case). Continuing the example above, the seed input may be provided by greybox fuzzer 104.

At block 306, executor 108 concretely executes the input in the software to collect a trace. The collected trace includes information that indicates the path taken through the software during the concrete execution of the input.

At block 308, executor 108 re-executes the input symbolically using the trace collected from the concrete execution of the input. In some implementations, executor 108 may perform the symbolic execution of the input using any suitable emulator, such as QEMU and Decaf, to name two examples. Executor 108 may collect the constraints satisfied by the input along the path executed through the software.

At decision block 310, executor 108 determines whether the concrete execution of the input discovers a new branch in the software. Executor 108 may check the record of discovered branches maintained in bitmap 114 to determine whether a new branch is discovered. If a new branch is discovered, then, at block 312, executor 108 updates the record of discovered branches to include the newly discovered branch or branches.

At block 314, executor 108 places the input in a queue 110 for transformation. In some implementations, queue 110 may be a priority queue. As will be further described below in conjunction with FIG. 4, inputs in queue 110 may be transformed and used to generate new inputs for symbolic execution of the software.

At block 316, executor 108 provides or otherwise makes available the input to greybox fuzzer 104. In some implementations, executor 108 may place the input in a queue that is accessible by greybox fuzzer 104, and notify or otherwise alert greybox fuzzer 104 of the new interesting input.

Otherwise, if, at decision block 310, a determination is made that a new branch is not discovered (no new branches are discovered), then, at block 318, executor 108 discards the input. For example, discarding the input may prevent further use of the input during hybrid fuzz testing of the software. Process 300 then ends at block 320.

With reference to FIG. 4, process 400 is initiated at block 402. Process 400 may be implemented by symbolic execution engine 106 of hybrid fuzz testing engine 102 as variously described herein. Continuing the example use case from FIG. 3, executor 108 may place inputs in queue 110 for transformation. The inputs placed in queue 110 may be inputs that discover new branches during concrete execution of the input in the software under test (software).

At block 404, executor 108, or other suitable component of symbolic execution engine 106, retrieves an input from queue 110. In some implementations, queue 110 may be a priority queue, and the input may be retrieved based on its priority in queue 110.

At block 406, executor 108, or other suitable component of symbolic execution engine 106, negates a constraint associated with the input. For example, the constraint may be collected during symbolic execution of the input in the software, as described previously with respect to block 308 of process 300 in FIG. 3. The negated constraint is then provided or otherwise made available to constraint solver 112.

At decision block 408, constraint solver 112 determines whether the negated constraint is satisfiable. If the negated constraint is satisfiable, then, at block 410, constraint solver 112 generates a model that solves the negated constraint. At block 412, constraint solver 112 provides or otherwise makes available the model as an interesting input to executor 108, or other suitable component of symbolic execution engine 106. The provided model may then be used to construct a new input for symbolic execution of the software. For instance, executor 108 may concretely execute the new input in the software.

Otherwise, if, at decision block 408, a determination is made that the negated constraint is not satisfiable, then, at block 414, constraint solver 112 provides (e.g., returns) an error condition to indicate that the negated constraint cannot be satisfied. Process 400 then ends at block 416.

Figure 5:
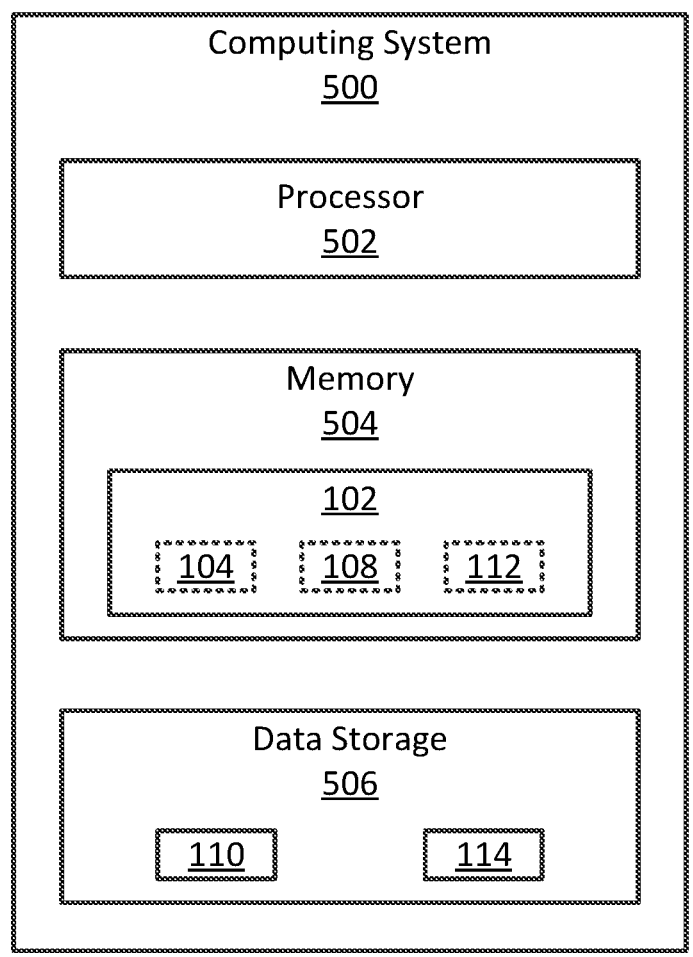
FIG. 5 is a block diagram illustrating selected components of an example computing system that may be used to perform any of the techniques as variously described in the present disclosure, all in accordance with at least some embodiments of the present disclosure.

FIG. 5 is a block diagram illustrating selected components of an example computing system 500 that may be used to perform any of the techniques as variously described in the present disclosure, in accordance with at least some embodiments of the present disclosure. In some embodiments, computing system 500 may be configured to implement or direct one or more operations associated with some or all of the engines, components and/or modules associated with hybrid fuzz testing engine 102 of FIG. 1. For example, greybox fuzzer 104, symbolic execution engine 106, and bitmap 114, or any combination of these may be implemented in and/or using computing system 500. In one example case, for instance, each of greybox fuzzer 104, executor 108, and constraint solver 112 is loaded in memory 504 and executable by a processor 502, and queue 110 and bitmap 114 is included in data storage 506. Computing system 500 may be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), or other form of computing or telecommunications device that is capable of communication and that has sufficient processor power and memory capacity to perform the operations described in this disclosure. A distributed computational system may be provided that includes a multiple of such computing devices. As depicted, computing system 500 may include processor 502, memory 504, and data storage 506. Processor 502, memory 504, and data storage 506 may be communicatively coupled.

In general, processor 502 may include any suitable special-purpose or general-purpose computer, computing entity, or computing or processing device including various computer hardware, firmware, or software modules, and may be configured to execute instructions, such as program instructions, stored on any applicable computer-readable storage media. For example, processor 502 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 5, processor 502 may include any number of processors and/or processor cores configured to, individually or collectively, perform or direct performance of any number of operations described in the present disclosure. Additionally, one or more of the processors may be present on one or more different electronic devices, such as different servers.

In some embodiments, processor 502 may be configured to interpret and/or execute program instructions and/or process data stored in memory 504, data storage 506, or memory 504 and data storage 506. In some embodiments, processor 502 may fetch program instructions from data storage 506 and load the program instructions in memory 504. After the program instructions are loaded into memory 504, processor 502 may execute the program instructions.

For example, in some embodiments, any one or more of the engines, components and/or modules of hybrid fuzz testing engine 102 may be included in data storage 506 as program instructions. Processor 502 may fetch some or all of the program instructions from data storage 506 and may load the fetched program instructions in memory 504. Subsequent to loading the program instructions into memory 504, processor 502 may execute the program instructions such that the computing system may implement the operations as directed by the instructions.

In some embodiments, virtualization may be employed in computing system 500 so that infrastructure and resources in computing system 500 may be shared dynamically. For example, a virtual machine may be provided to handle a process running on multiple processors so that the process appears to be using only one computing resource rather than multiple computing resources. Multiple virtual machines may also be used with one processor.

Memory 504 and data storage 506 may include computer-readable storage media for carrying or having computer-executable instructions or data structures stored thereon. Such computer-readable storage media may include any available media that may be accessed by a general-purpose or special-purpose computer, such as processor 502. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 502 to perform a certain operation or group of operations.

Modifications, additions, or omissions may be made to computing system 500 without departing from the scope of the present disclosure. For example, in some embodiments, computing system 500 may include any number of other components that may not be explicitly illustrated or described herein.

As indicated above, the embodiments described in the present disclosure may include the use of a special purpose or a general-purpose computer (e.g., processor 502 of FIG. 5) including various computer hardware or software modules, as discussed in greater detail herein. As will be appreciated, once a general-purpose computer is programmed or otherwise configured to carry out functionality according to an embodiment of the present disclosure, that general-purpose computer becomes a special purpose computer. Further, as indicated above, embodiments described in the present disclosure may be implemented using computer-readable media (e.g., memory 504 of FIG. 5) for carrying or having computer-executable instructions or data structures stored thereon.

Numerous example variations and configurations will be apparent in light of this disclosure. According to some examples, computer-implemented methods for branch coverage guided symbolic execution for hybrid fuzzing are described. An example computer-implemented method may include: receiving a seed input of a binary program under analysis (BPUA) that is discovered during testing by a greybox fuzzer; concretely executing the seed input in the BPUA; collecting a trace resulting from the concrete execution of the seed input; determining whether the concrete execution of the seed input discovers a new branch; and responsive to a determination that the concrete execution of the seed input discovers a new branch, updating a bitmap to indicate that the new branch is discovered, wherein the bitmap is utilized by the greybox fuzzer to maintain a record of discovered branches in BPUA, and providing the seed input to the greybox fuzzer.

In some examples, the method may also include: re-executing the seed input symbolically in the BPUA using the trace; and collecting one or more constraints satisfied by the seed input along a path executed through the BPUA, wherein a constraint is used to transform the seed input. In other examples, the path is based on the trace. In still other examples, the method may also include, responsive to a determination that the concrete execution of the seed input discovers a new branch: retrieving an input from a queue; negating a constraint associated with the input; determining whether the negated constraint is satisfiable; responsive to a determination that the negated constraint is satisfiable, generating a model that solves the negated constraint; and generating a new input using the model. In yet other examples, the queue is a priority queue, and the input is retrieved according to an assigned priority. In further examples, the method may also include, responsive to a determination that the concrete execution of the seed input does not discover a new branch, discarding the seed input. In still further examples, determining whether the concrete execution of the seed input discovers a new branch is based on information contained in the bitmap. In yet further examples, the seed input is an arbitrary input.

According to some examples, computer program products including one or more non-transitory machine-readable mediums encoded with instructions that when executed by one or more processors cause a process to be carried out for branch coverage guided symbolic execution for hybrid fuzzing are described. An example process may include: receiving, by a symbolic execution engine a seed input of a binary program under analysis (BPUA) that is discovered during testing by a greybox fuzzer; concretely executing, by the symbolic execution engine, the seed input in the BPUA; collecting, by the symbolic execution engine, a trace resulting from the concrete execution of the seed input; determining, by the symbolic execution engine, whether the concrete execution of the seed input discovers a new branch; and responsive to a determination that the concrete execution of the seed input discovers a new branch, updating, by the symbolic execution engine, a bitmap to indicate that the new branch is discovered, wherein the bitmap is utilized by the greybox fuzzer to maintain a record of discovered branches in BPUA, placing, by the symbolic execution engine, the seed input in a queue, and providing, by the symbolic execution engine, the seed input to the greybox fuzzer.

In some examples, the process may also include: re-executing, by the symbolic execution engine, the seed input symbolically in the BPUA using the trace; and collecting, by the symbolic execution engine, one or more constraints satisfied by the seed input along a path executed through the BPUA, wherein a constraint is used to transform the seed input. In other examples, the path is based on the trace. In still other examples, the process may also include, responsive to a determination that the concrete execution of the seed input discovers a new branch: retrieving, by the symbolic execution engine, an input from the queue; negating, by the symbolic execution engine, a constraint associated with the input; determining, by the symbolic execution engine, whether the negated constraint is satisfiable; responsive to a determination that the negated constraint is satisfiable, generating, by the symbolic execution engine, a model that solves the negated constraint; and generating, by the symbolic execution engine, a new input using the model. In yet other examples, the queue is a priority queue, and the input is retrieved according to an assigned priority. In further examples, the process may further include, responsive to a determination that the concrete execution of the seed input does not discover a new branch, discarding the seed input. In still further examples, determining whether the concrete execution of the seed input discovers a new branch is based on information contained in the bitmap.

According to other examples, systems to perform branch coverage guided symbolic execution for hybrid fuzzing are described. An example system may include: one or more non-transitory machine-readable mediums configured to store instructions; and one or more processors configured to execute the instructions stored on the one or more non-transitory machine-readable mediums. Execution of the instructions by the one or more processors may cause the one or more processors to: receive a seed input of a binary program under analysis (BPUA) that is discovered during testing by a greybox fuzzer, concretely execute the seed input in the BPUA, collect a trace resulting from the concrete execution of the seed input, re-execute the seed input symbolically in the BPUA using the trace, collect one or more constraints satisfied by the seed input along a path executed through the BPUA, determine whether the concrete execution of the seed input discovers a new branch; and responsive to a determination that the concrete execution of the seed input discovers a new branch, update a bitmap to indicate that the new branch is discovered, wherein the bitmap is utilized by the greybox fuzzer to maintain a record of discovered branches in BPUA, place the seed input in a queue, and provide the seed input to the greybox fuzzer.

In some examples, the path is based on the trace. In other examples, execution of the instructions causes the one or more processors to, responsive to a determination that the concrete execution of the seed input discovers a new branch: retrieve an input from the queue; negate a constraint associated with the input; determine whether the negated constraint is satisfiable; responsive to a determination that the negated constraint is satisfiable, generate a model that solves the negated constraint; and generate a new input using the model. In still other examples, the queue is a priority queue, and the input is retrieved according to an assigned priority. In yet other examples, execution of the instructions causes the one or more processors to, responsive to a determination that the concrete execution of the seed input does not discover a new branch, discard the seed input.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer-implemented method for branch coverage guided symbolic execution for hybrid fuzzing, the method comprising:
   receiving, at a symbolic execution engine, a seed input of a binary program under analysis (BPUA) that is discovered during testing of the BPUA by a greybox fuzzer;
   concretely executing, at the symbolic execution engine, the BPUA using the seed input;
   collecting a trace resulting from the concrete execution by the symbolic execution engine of the BPUA using the seed input;
   determining a number of new branches discovered by the concrete execution of the BPUA using the seed input by comparing branches executed in the trace to a bitmap indicative of discovered branches previously discovered during prior executions of the BPUA by the greybox fuzzer and the symbolic execution engine; and
   responsive to a determination that the concrete execution of the BPUA using the seed input discovers at least one new branch:
      updating the bitmap to indicate that the new branch is discovered, wherein the bitmap is utilized by the greybox fuzzer and the symbolic execution engine during the testing of the BPUA to maintain a record of discovered branches in the BPUA;
      assigning a priority to the seed input based on the number of new branches discovered;
      providing the seed input to a priority queue;
      after obtaining the seed input from the priority queue according to the assigned priority, symbolically executing the BPUA along the trace using a symbol of the seed input;
      collecting one or more constraints satisfied along the trace symbolically executed through the BPUA, wherein at least one of the one or more constraints is used to transform the seed input; and
      providing the transformed seed input to the greybox fuzzer.

2. The method of claim 1, further comprising, responsive to a determination that the concrete execution of the BPUA using the seed input discovers at least one new branch:
   negating a constraint of the one or more satisfied constraints;
   determining whether the negated constraint is satisfiable;
   responsive to a determination that the negated constraint is satisfiable:
      generating a model that solves the negated constraint;
      generating a new input using the model; and
      providing the new input to the greybox fuzzer for execution.

3. The method of claim 2, wherein providing the new input to the greybox fuzzer comprises:
   assigning a fuzzing priority to the new input; and
   providing the new input to a fuzzing priority queue such that the new input is retrieved according to the assigned fuzzing priority.

4. The method of claim 1, further comprising, responsive to a determination that the concrete execution of the BPUA using the seed input does not discover a new branch, discarding the seed input.

5. The method of claim 1, wherein the seed input is an arbitrary input.

6. A computer program product including one or more non-transitory machine-readable mediums encoded with instruction that when executed by one or more processors cause a process to be carried out for branch coverage guided symbolic execution for hybrid fuzzing, the process comprising:
receiving, by a symbolic execution engine, a seed input of a binary program under analysis (BPUA) that is discovered during testing of the BPUA by a greybox fuzzer;
concretely executing, by the symbolic execution engine, the BPUA using the seed input;
collecting, by the symbolic execution engine, a trace resulting from the concrete execution of the BPUA using the seed input;
determining, by the symbolic execution engine, a number of new branches discovered by the concrete execution of the BPUA using the seed input by comparing branches executed in the trace to a bitmap indicative of discovered branches previously discovered during prior executions of the BPUA by the greybox fuzzer and the symbolic execution engine; and
responsive to a determination that the concrete execution of the BPUA using the seed input discovers at least one new branch:
updating, by the symbolic execution engine, the bitmap to indicate that the new branch is discovered, wherein the bitmap is utilized by the greybox fuzzer and the symbolic execution engine during the testing of the BPUA to maintain a record of discovered branches in BPUA;
assigning a priority to the seed input based on the number of new branches discovered;
providing the seed input to a priority queue;
after obtaining the seed input from the priority queue according to the assigned priority, symbolically executing the BPUA along the trace using a symbol of the seed input;
collecting one or more constraints satisfied along the trace symbolically executed through the BPUA, wherein at least one of the one or more constraints is used to transform the seed input;
placing the transformed seed input in a fuzzing queue; and
providing the transformed seed input to the greybox fuzzer.

7. The computer program product of claim 6, the process further comprising, responsive to a determination that the concrete execution of the BPUA using the seed input discovers at least one new branch:
negating, by the symbolic execution engine, a constraint of the one or more constraints satisfied by the seed input;
determining, by the symbolic execution engine, whether the negated constraint is satisfiable;
responsive to a determination that the negated constraint is satisfiable:
generating, by the symbolic execution engine, a model that solves the negated constraint;
generating, by the symbolic execution engine, a new input using the model; and
providing the new input to the greybox fuzzer for execution.

8. The computer program product of claim 6, wherein the fuzzing queue is a fuzzing priority queue, wherein placing the transformed seed input in the fuzzing priority queue comprises assigning a fuzzing priority to the transformed seed input, and wherein the transformed seed input is retrieved according to the assigned fuzzing priority.

9. The computer program product of claim 6, the process further comprising, responsive to a determination that the concrete execution of the BPUA using the seed input does not discover a new branch, discarding the seed input.

10. A system to perform branch coverage guided symbolic execution for hybrid fuzzing, the system comprising:
one or more non-transitory machine-readable mediums configured to store instructions; and
one or more processors configured to execute the instructions stored on the one or more non-transitory machine-readable mediums, wherein execution of the instructions causes the one or more processors to:
receive a seed input of a binary program under analysis (BPUA) that is discovered during testing of the BPUA by a greybox fuzzer;
concretely execute the BPUA using the seed input;
collect a trace resulting from the concrete execution of the BPUA using the seed input;
determine a number of new branches discovered by the concrete execution of the BPUA using the seed input by comparing branches executed in the trace to a bitmap indicative of discovered branches previously discovered during prior executions of the BPUA by the greybox fuzzer; and
responsive to a determination that the concrete execution of the BPUA using the seed input discovers at least one new branch:
update a bitmap to indicate that the new branch is discovered, wherein the bitmap is utilized by the greybox fuzzer during the testing of the BPUA to maintain a record of discovered branches in BPUA;
assign a priority to the seed input based on the number of new branches discovered;
provide the seed input to a priority queue;
after obtaining the seed input from the priority queue according to the assigned priority, symbolically execute the BPUA along the trace using a symbol of the seed input;
collect one or more constraints satisfied along the trace symbolically executed through the BPUA, wherein at least one of the one or more constraints is used to transform the seed input;
place the transformed seed input in a fuzzing queue; and
provide the transformed seed input to the greybox fuzzer.

11. The system of claim 10, wherein execution of the instructions causes the one or more processors to, responsive to a determination that the concrete execution of the BPUA using the seed input discovers at least one new branch:
negate a constraint of the one or more constraints satisfied by the seed input;
determine whether the negated constraint is satisfiable;
responsive to a determination that the negated constraint is satisfiable:
generate a model that solves the negated constraint;
generate a new input using the model; and providing the new input to the greybox fuzzer for execution.

12. The system of claim 11, wherein the fuzzing queue is a fuzzing priority queue, wherein placing the transformed input seed in the fuzzing priority queue comprises assigning a fuzzing priority to the transformed seed input, and wherein the transformed seed input is retrieved according to the assigned fuzzing priority.

13. The system of claim 10, wherein execution of the instructions causes the one or more processors to, responsive to a determination that the concrete execution of the BPUA using the seed input does not discover a new branch, discard the seed input.

* * * * *